(12) United States Patent
Horai et al.

(10) Patent No.: US 7,022,393 B2
(45) Date of Patent: Apr. 4, 2006

(54) OPTICAL RECORDING MEDIUM

(75) Inventors: Takashi Horai, Tokyo (JP); Hiroyuki Arioka, Tokyo (JP); Narutoshi Fukuzawa, Tokyo (JP); Syuji Tsukamoto, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/014,855

(22) Filed: Dec. 20, 2004

(65) Prior Publication Data

US 2005/0100704 A1  May 12, 2005

Related U.S. Application Data

(63) Continuation of application No. 10/394,257, filed on Mar. 24, 2003, now abandoned.

(30) Foreign Application Priority Data

Mar. 26, 2002  (JP) .............................. 2002-85993

(51) Int. Cl.
   *B32B 3/02* (2006.01)
(52) U.S. Cl. .................. 428/64.1; 428/64.4; 428/64.8; 430/270.18; 430/270.2
(58) Field of Classification Search .............. 428/64.1, 428/64.4, 64.8; 430/270.14, 270.18, 270.2
See application file for complete search history.

(56) References Cited

U.S. PATENT DOCUMENTS

| | | | |
|---|---|---|---|
| 4,412,231 A | 10/1983 | Namba et al. | |
| 5,161,150 A | 11/1992 | Namba et al. | |
| 5,389,419 A | 2/1995 | Maeda et al. | |
| 5,536,548 A | 7/1996 | Koji et al. | |
| 5,633,106 A | 5/1997 | Aihara et al. | |
| 5,679,430 A * | 10/1997 | Shinkai et al. | 428/64.1 |
| 5,776,656 A | 7/1998 | Shinkai et al. | |
| 5,817,388 A * | 10/1998 | Hurditch | 428/64.1 |
| 5,939,163 A * | 8/1999 | Ueno et al. | 428/64.1 |
| 6,168,843 B1 * | 1/2001 | Kambe et al. | 428/64.1 |
| 6,197,477 B1 * | 3/2001 | Satoh et al. | 430/270.16 |
| 6,214,519 B1 | 4/2001 | Suzuki et al. | |
| 6,218,072 B1 | 4/2001 | Otaguro et al. | |
| 6,225,023 B1 | 5/2001 | Okamoto et al. | |
| 6,226,255 B1 | 5/2001 | Suzuki et al. | |
| 6,558,768 B1 | 5/2003 | Noguchi et al. | |
| 2003/0124459 A1* | 7/2003 | Yashiro et al. | 430/270.19 |
| 2004/0043255 A1* | 3/2004 | Horai et al. | 428/694 OSC |

FOREIGN PATENT DOCUMENTS

EP          458257         11/1991

(Continued)

OTHER PUBLICATIONS

English Language Abstract of JP 2001-152040.

(Continued)

*Primary Examiner*—Elizabeth Mulvaney
(74) *Attorney, Agent, or Firm*—Greenblum & Bernstein, P.L.C.

(57) ABSTRACT

An optical recording medium can be recorded at a high linear velocity of at least 10 m/s while maintaining an excellent light stability and favorable reflectance. A recording medium is constructed of a recording layer on a substrate, the recording layer including a first dye with a maximum absorption wavelength in a thin-film state of 450 nm to 620 nm inclusive as a first dye and being formed so as to include a second dye with an extinction coefficient of at least 0.5 for a recording wavelength. In this case, it is preferable for the second dye to have a maximum absorption wavelength of 620 nm to 750 nm inclusive in a thin-film state.

16 Claims, 1 Drawing Sheet

FOREIGN PATENT DOCUMENTS

| | | |
|---|---|---|
| EP | 438387 | 5/1992 |
| JP | 7-251567 | 10/1995 |
| JP | 7-266705 | 10/1995 |
| JP | 9-254543 | 9/1997 |
| JP | 10244755 | 9/1998 |
| JP | 2001-76343 | 3/2001 |
| JP | 2001-152040 | 6/2001 |
| JP | 2001-322356 | 11/2001 |
| JP | 2002-36726 | 2/2002 |
| JP | 2002-260227 | 9/2002 |
| JP | 2003-034078 | 2/2003 |

OTHER PUBLICATIONS

English Language Abstract of JP 7-251567.
English Language Abstract of JP 2001-76343.
English Language Abstract of JP 2001-322356.
English Language Abstract of JP 9-254543.
English Language Abstract of JP 2002-36726.
English Langage Abstract of JP 10/244755.
CRC Handbook of Chemistry and Physics 63$^{rd}$ Ed. Pp. F-76, F-79 and F-92 (1983).
English Language Abstract of JP 2002-260227.
English Language Abstract of JP 2003-034078.

* cited by examiner

F I G. 1
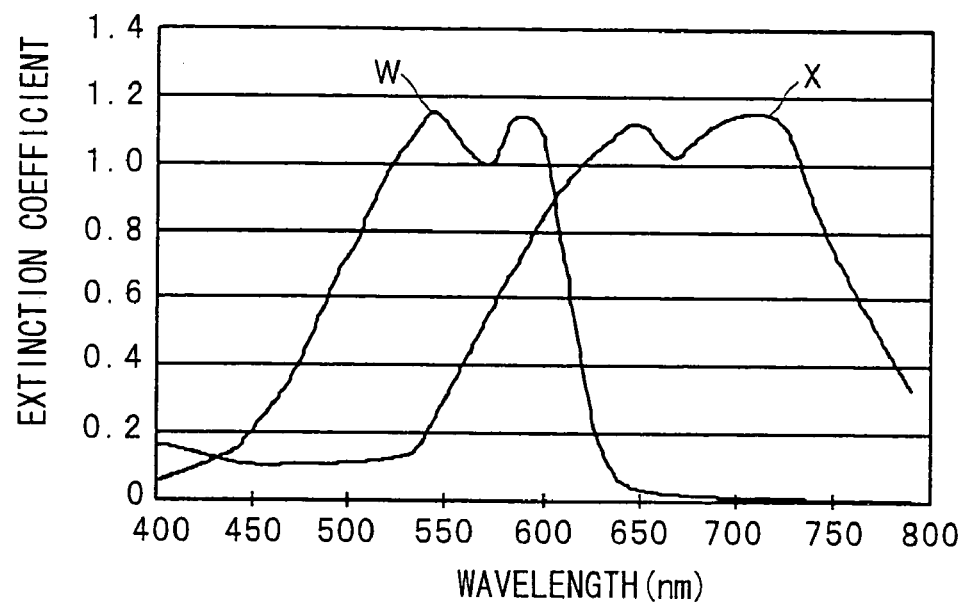
F I G. 2
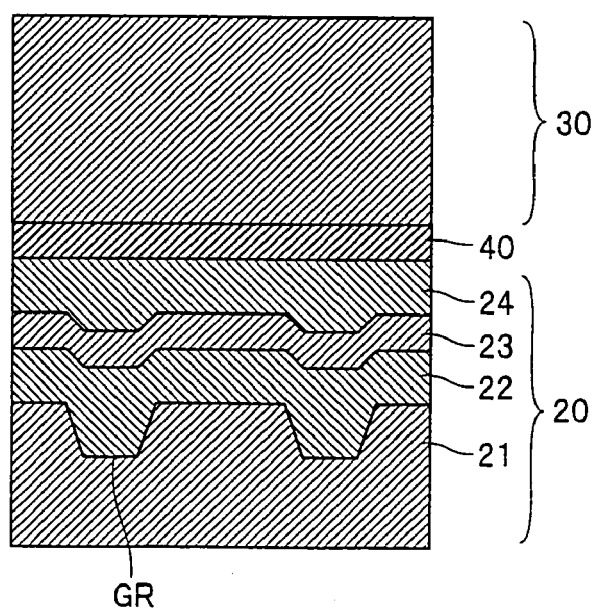

OPTICAL RECORDING MEDIUM

CROSS REFERENCE TO RELATED APPLICATION

This application is a continuation of U.S. patent application Ser. No. 10/394,257, filed on Mar. 24, 2003, now abandoned which claims priority of Japanese patent application No. 2002-085993 filed on Mar. 26, 2002, both of which are hereby incorporated herein in their entireties by reference.

BACKGROUND OF THE INVENTION

1. Field of the Invention

The present invention relates to an optical recording medium where dye is used in the recording layer, and in particular to an optical recording medium that can be recorded at high speed.

2. Description of the Related Art

Large-capacity recordable optical discs (called DVD-R discs) have come onto the market as optical recording media that are capable of digital recording. DVD-R discs are constructed with a recording layer, a reflective layer, and a protective layer being successively formed on top of one another on a light-transmitting substrate, and have been standardized as media for which recording and reproduction can be performed by a laser with a wavelength of 630 nm to 680 nm inclusive. Guide grooves that are required for recording information using a laser are formed on the light-transmitting base substrate of a DVD-R disc, with the form of such guide grooves being optimized for overall signal quality, which includes various recording and reproduction characteristics and servo signal characteristics, etc. As one example, these guide grooves are formed with a pitch around 0.6 μm to 0.7 μm. On the other hand, the recording layer is formed of a variety of recording materials, and as one example is formed of a chelate compound of a metal and a dye that is represented by the general formula (I) shown below, which is to say, a metal azo dye.

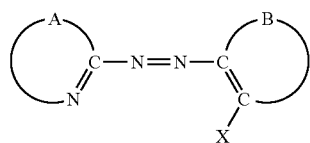

It should be noted that in the above formula (I), A represents residue that forms, together with the carbon atom and nitrogen atom with which A is combined, a heterocyclic ring, B represents residue that forms, together with two carbon atoms with which B is combined, an aromatic ring or a heterocyclic ring, and X represents a hydroxyl group, a carboxyl group, a sulfonic acid-derivative group, or $(NSO_2Q)^-$, where Q represents an alkyl group of one to six carbon atoms that may be substituted with one or more fluorine atoms as the substituent(s).

In this case, the dye is not limited to a metal azo dye, but as shown by the characteristic W in FIG. 1, the characteristics of the dye used in a DVD-R disc (such as a metal azo dye or a cyanine dye) are such that the maximum absorption wavelength for a thin film is between 450 nm and 620 nm inclusive, which is shorter than the laser wavelength for recording and reproduction (between 630 nm and 680 nm inclusive) and the extinction coefficient for the laser wavelength for recording and reproduction is around 0.01 to 0.03. Accordingly, a recording layer that is formed using 100% of the dyes mentioned above, including the metal azo dye, will have the same characteristics, thereby ensuring a sufficiently high reflectance for the laser wavelength used for recording and reproduction. Out of such dyes, metal azo dye has an excellent light stability, so that a recording layer formed of such dye also has excellent light stability. It should be noted that for the characteristic W in FIG. 1, two maximum absorption wavelengths (around 540 nm and around 590 nm) appear in the range from 450 nm to 620 nm inclusive, but that in the present application, a group of maximum absorption wavelengths where there is little drop in the extinction coefficient between the two ends of a narrow range such as this is treated as a single maximum absorption wavelength. In this case, the maximum absorption wavelength that represents a range that is being treated as a single maximum absorption wavelength, out of the group of maximum absorption wavelengths, with the highest extinction coefficient. Accordingly, for the characteristic W in FIG. 1, since the wavelength of around 540 nm has a higher extinction coefficient than the wavelength of around 590 nm, around 540 nm is set as the maximum absorption wavelength. This is also the case for the rest of this specification.

An optical disc that is constructed of a recording layer composed of 100% of the dyes mentioned above, such as metal azo dye, has the following drawback that needs to be improved. According to the fundamental specification for DVD-R discs, the linear velocity is set at 3.49 m/s (single speed) and such optical recording media are designed so that recording can be performed at this speed. Optical recording media that can be recorded at a faster speed, such as double speed, have also been verified. However, recently there have been demands for DVD-R discs that can be recorded at higher linear velocities of 10 m/s and above (such as quad speed). Experiments conducted by the inventors of the present invention have confirmed that when recording is performed using a recording laser with a conventional output, the recording layer is not sufficiently sensitive, so that recording on an optical recording medium is problematic at a linear velocity of 10 m/s or above. Experiments have also confirmed that it is possible to perform recording at quad speed using methods such as raising the output of the recording laser to compensate for the insufficient sensitivity of the recording layer or changing the composition of the recording layer to raise the sensitivity. However, there are limits on the output of a recording laser, and in view of factors such as the durability of the laser, it is preferable for the output of the recording laser to be a predetermined level or below. Accordingly, methods that raise the output of the recording laser to compensate for the insufficient sensitivity of the recording layer are not realistic. On the other hand, with methods that make significant changes to the composition of the recording layer, it is difficult to maintain the electrical characteristics (excellent light stability and favorable reflectance) of the recording layer that is composed of the DVD-R dyes described above, and in many cases such changes cause problems, such as an increase in the error rate or a decrease in the reflectance. Accordingly, one issue for current optical recording media is that it is difficult to perform recording at high speed while maintaining the excellent light stability and favorable reflectance.

SUMMARY OF THE INVENTION

It is an object of the present invention to provide an optical recording medium that is capable of being recorded at a high linear velocity of at least 10 m/s while maintaining an excellent light stability and favorable reflectance.

(1) The stated object is achieved by an optical recording medium according to the present invention that is an optical recording medium constructed by providing, on a substrate, a recording layer including a first dye, which in a thin-film state has a maximum absorption wavelength of 450 nm to 620 nm inclusive, as a main component, the recording layer being formed so as to include a second dye with an extinction coefficient of at least 0.5 for a recording wavelength. It should be noted that the expression "maximum absorption wavelength in a thin-film state" refers to a maximum absorption wavelength when a film of an organic dye is formed as the recording layer. In this case, the behavior of the maximum absorption spectrum for the thin film-state differs to that of the maximum absorption spectrum for a dissolved state where the dye has been dissolved by a solvent. The maximum absorption spectrum in the thin-film state can be measured as described below, for example, but the present invention is not limited to this method. This is to say, in general, the dye in question is first dissolved in an organic solvent with a concentration of 1 to 20% by weight. A thin film is then produced with a thickness of around 60 to 200 nm by spin coating a flat PC (polycarbonate) substrate with no grooves or pits so that the film exhibits no particular orientation. After this, the dye is dried at 50 to 70° C. When doing so, it is preferable to select an organic solvent that can dissolve the dye and has a boiling point in air of 50 to 150° C. A different solvent is selected if there is prominent crystallization of the dye or association occurs when solvent volatilization occurs during the spin coating. After the film has been formed, a spectrophotometer is used to measure the transmission/absorption spectrum for the flat PC substrate to which the manufactured thin film of dye is attached. It is also possible to measure the extinction coefficient (an optical constant) according to the measuring method described above. That is, a PC substrate with an attached thin film of dye is manufactured and the same kind of PC substrate with attached thin film is also manufactured with a reflective film of gold being additionally formed. Next, a spectrophotometer is used to measure the transmission at a required wavelength of the PC substrate with attached thin film and to measure the reflectance at the required wavelength of the PC substrate with attached thin film on which the gold film is formed. After this, the extinction coefficient is calculated from the measurements of the transmission and the reflectance.

According to the present optical recording medium, the recording layer is formed so as to include a second dye with an extinction coefficient of at least 0.5 at the recording wavelength. This makes it possible to provide an optical recording medium that can be recorded at a high linear velocity of at least 10 m/s while maintaining excellent light stability and favorable reflectance.

(2) In this case, it is preferable for the second dye to have a maximum absorption wavelength of 620 nm to 750 nm inclusive.

(3) The extinction coefficient of the recording layer in a thin-film state is preferably in a range of 0.03 to 0.1 inclusive for a wavelength of 660 nm.

(4) The recording layer is preferably formed so as to include 0.5% to 5% inclusive by weight of the second dye.

(5) With this optical recording medium, it is preferable for the first dye to be one or a combination of two or more metal azo dyes selected from a group consisting of chelate compounds of a metal and a dye shown by a general formula (I) below

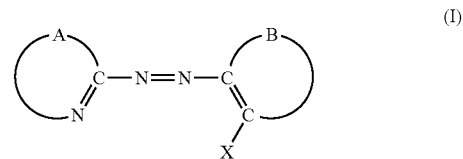

where A represents residue that forms, together with the carbon atom and nitrogen atom with which A is combined, a heterocyclic ring, B represents residue that forms, together with two carbon atoms with which B is combined, an aromatic ring or a heterocyclic ring, and X represents a hydroxyl group, a carboxyl group, a sulfonic acid-derivative group, or $(NSO_2Q)^-$, where Q represents an alkyl group of one to six carbon atoms that an alkyl group of one to six carbon atoms that may be substituted with one or more fluorine atoms as the substituent(s).

(6) With this optical recording medium, it is preferable for the second dye to be composed of a pentamethine cyanine dye shown by a general formula (II) below

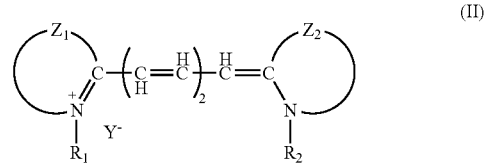

where R1 and R2 each separately represent an alkyl group of one to six carbon atoms that may be substituted or unsubstituted or an alkenyl group of one to six carbon atoms that may be substituted or unsubstituted, Z1 and Z2 each separately represent a heterocycle with five or six members or an atom group that forms a condensed ring including a heterocycle with five or six members, and Y expresses a univalent anion.

It should be noted that the present disclosure relates a patent application No. 2002-085993 filed in Japan on 26 Mar., 2002, the contents of which are hereby incorporated by reference.

BRIEF DESCRIPTION OF THE DRAWINGS

These and other objects and features of the present invention will be explained in more detail below with reference to the attached drawings, wherein:

FIG. 1 is a characteristic graph showing the relationship between the laser wavelength and the extinction coefficient for each of a metal azo dye and pentamethine cyanine dye that are used in an optical recording medium 10 according to an embodiment of the present invention; and FIG. 2 is a partial cross-sectional figure showing the construction of a DVD-R disc.

DESCRIPTION OF THE PREFERRED EMBODIMENT

The following describes a preferred embodiment of an optical recording medium according to the present invention, with reference to the attached drawings.

An optical recording medium (DVD-R) according to the present invention is constructed with at least a recording layer, including a first dye as a main component, provided on a substrate and a reflective layer provided on top of the recording layer. A second dye composes 0.5 to 5% by weight inclusive of the total weight of dye in the recording layer. The optical recording medium according to the present invention is constructed so as to be suited to the recording of information on the recording layer by a laser with a wavelength of between 630 nm and 680 nm inclusive and to the recording of information on the recording layer at a linear velocity of at least 10 m/s.

In this case, the first dye functions as the dye that determines the main characteristics of the recording layer and, as shown by the characteristic W in FIG. 1, the characteristics of the dye are such that the maximum absorption wavelength region for a thin film of the dye is 450 nm to 620 nm inclusive, which is shorter than the recording/reproduction laser wavelength (also referred to simply as the "recording wavelength" and "reproduction wavelength", specifically a range of 630 nm to 680 nm inclusive) and has an extinction coefficient of around 0.01 to 0.03 at the recording/reproduction laser wavelength. More specifically, the first dye is composed of one or a combination of two or more types of chelate compound (metal azo dye) where a dye (organic azo dye) shown by the general formula (I) is combined with metal.

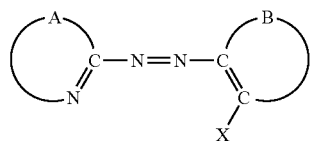
(I)

In the above formula (I), A represents residue that forms, together with the carbon atom and nitrogen atom with which A is combined, a heterocyclic ring, B represents residue that forms, together with two carbon atoms with which B is combined, an aromatic ring or a heterocyclic ring, and X represents a hydroxyl group, a carboxyl group, a sulfonic acid-derivative group, or $(NSO_2Q)^-$, where Q represents an alkyl group of one to six carbon atoms that an alkyl group of one to six carbon atoms that may be substituted with one or more fluorine atoms as the substituent(s).

The second dye is added to increase the recording sensitivity of the recording layer and so make it possible to record information at a linear velocity of at least 10 m/s (at quad speed, for example) As shown by the characteristic X in FIG. 1, the characteristics of the second dye are such that the maximum absorption wavelength of the second dye in a thin-film state is in a range of 620 nm to 750 nm inclusive (while not shown in FIG. 1, the wavelength at which the extinction coefficient is highest is around 720 nm, so that in this example the maximum absorption wavelength is around 720 nm) and the extinction coefficient of a thin film is 0.5 or above for the recording/reproduction laser wavelength. More specifically, it is preferable to use a dye shown by the general formula (II) below as the second dye, with it being possible to use pentamethine cyanine dye shown in formula (III) below as a specific example.

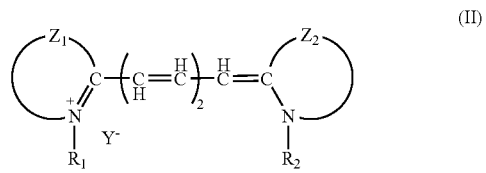
(II)

It should be noted that in this formula (II), R1 and R2 each separately represent an alkyl group of one to six carbon atoms that may be substituted or unsubstituted or an alkenyl group of one to six carbon atoms that may be substituted or unsubstituted, Z1 and Z2 each separately represent a heterocycle with five or six members or an atom group that forms a condensed ring including a heterocycle with five or six members, and Y expresses a univalent anion.

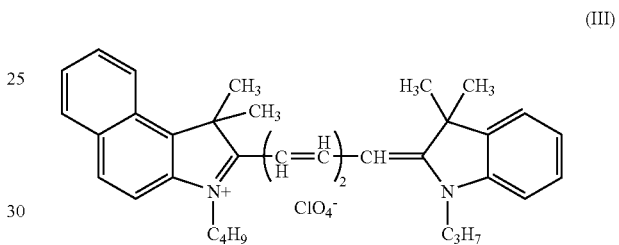
(III)

Aside from pentamethine cyanine dye, trimethine cyanine dye shown by formula (IV) below, heptamethine cyanine dye shown by formula (V) below, and the like can be used as the second dye.

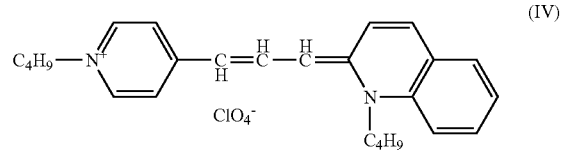
(IV)

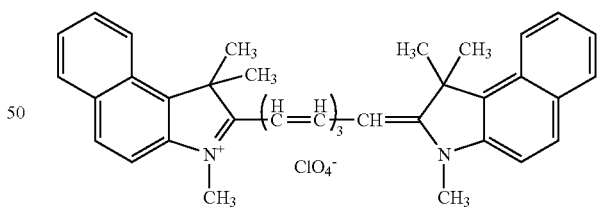
(V)

With the above construction, the recording layer has a characteristic whereby the extinction coefficient for a thin film is between 0.03 and 0.1 inclusive at the recording/reproduction laser wavelength (for example, 660 nm).

In this optical recording medium, the recording layer is composed of a metal azo dye as a main component, and a dye, such as pentamethine cyanine dye, that has a high extinction coefficient (an extinction coefficient of 0.5 or above) at the recording/reproduction laser wavelength in a thin-film state is added to the recording layer as a second dye. This means that the recording layer has the same excellent light stability as a recording layer composed of 100% metal azo dye and the favorable reflectance for the recording/reproduction laser wavelength is maintained, with the added pentamethine cyanine dye raising the absorption of the recording/reproduction laser wavelength so that the recording sensitivity for the recording/reproduction laser wavelength is raised. That is, with this optical recording medium, the excellent light stability and favorable reflectance can be maintained, with it also being possible to record information at a linear velocity of at least 10 m/s (quad speed being 14 m/s). When a dye with an extinction coefficient of below 0.5 is used as the second dye, it is necessary to add a large amount of dye to obtain the intended recording sensitivity, but when a large amount of the second dye is added, the resulting drop in the amount of the first dye can lead to an increase in the error rate, a drop in the modulation factor due to a drop in the refractive index, and a drop in reflectance, so that it is no longer possible to obtain the reproduction characteristics and high-speed recording characteristics required of a DVD-R disc. On the other hand, when a dye with an extinction coefficient of 0.5 or above is used as the second dye, the added amount of the second dye can be suppressed to 5% by weight or below. Since a sufficient amount of the first dye can be added, it is possible to sufficiently obtain the reproduction characteristics and high-speed recording characteristics required of a DVD-R disc. It should be noted that logically speaking, there is no upper limit on the extinction coefficient of the dye that can be used as the second dye, but when a dye that can achieve a large effect in small amounts is added, minute differences in the added amount of dye can cause variations in the recording sensitivity, which makes it difficult to manufacture discs reliably. For this reason, it is preferable to use a dye with an extinction coefficient of 2 or less as a dye in an optical recording medium and to add at least 0.5% by weight of such dye.

Embodiments

The following describes the present invention in detail with reference to several representative embodiments.

First the fundamental construction of the optical recording medium used in these embodiments will be described with reference to FIG. 2. The optical recording medium 10 is an optical recording medium that conforms to DVD-R Standard, and is constructed of a disc 20 that is recordable and a disc 30 (dummy substrate) that are bonded together by an adhesive 40. In this case, the disc 20 is composed of a substrate 21 in which grooves GR are formed (this substrate is normally formed of polycarbonate resin and is around 0.6 mm thick), and a recording layer 22, a reflective layer 23, and a protective layer 24 that are provided in order one on top of the other on top of the substrate 21. The disc 30 is composed of the same material as the substrate 21, for example. The adhesive 40 can be freely selected from materials such as a UV-hardening resin or a thermal-hardening resin. The adhesive layer formed of the adhesive 40 is formed around 10 μm to 200 μm thick.

The substrate 21 is formed in the shape of a disc and to make it possible to perform recording and reproduction from the rear surface, is formed of a resin or glass that is effectively transparent (a transmittance of 88% or above is preferable) for the recording/reproduction laser wavelength (a wavelength of around 630 nm to 680 nm). In this case, various kinds of thermoplastic resin, such as polycarbonate resin, acrylic resin, amorphous polyolefin, TPX, and polystyrene resin, can be used as the resin.

The recording layer 22 is formed with a thickness of between 30 nm and 300 nm inclusive. The reflective layer 23 is formed of a highly reflective metal or alloy, such as Au, Cu, Al, Ag, and AgCu. The reflective layer 23 should preferably be at least 50 nm thick and is formed by vacuum evaporation, sputtering, etc. The protective layer 24 is formed with a thickness of around 0.5 μm to 100 μm. Various types of resin can be used for the protective layer 24, such as UV hardening resin.

When information is recorded on this optical recording medium 10, the recording/reproduction laser is emitted in pulses through the substrate 21. As a result, the reflectivity of light at the incident position on the recording layer 22 changes, thereby recording the information.

Next, the testing and evaluating methods used for the embodiments will be described. It should be noted that before the tests were performed, a "DDU-1000" evaluator (made by PULSTEC INDUSTRIAL CO., LTD, with a wavelength of 661 nm and a numerical aperture of 0.60) was used to record information on the recording layer at linear velocities of 3.49 m/s and 14.0 m/s, with the recording laser power of the laser pickup-head being progressively raised.

Optimal Recording Power

The optimal recording power is the output value for the recording laser power at the lowest jitter value for a case where information that has been recorded at the above linear velocity of 14.0 m/s is reproduced at a linear velocity of 3.49 m/s using the "DDU-1000" evaluator (PULSTEC INDUSTRIAL CO., LTD, using a wavelength of 650 nm and a numerical aperture of 0.60). The following evaluation standards were used for evaluating the optimal recording power.

Evaluation Standards

PASS (O): An optimal recording power of 24 mW or below
FAIL (X): An optimal recording power of above 24 mW Jitter Jitter was evaluated using the following evaluation standards when reproducing information that has been recorded at the linear velocities of 3.49 m/s and 14.0 m/s at a linear velocity of 3.49 m/s using the "DDU-1000" evaluator (PULSTEC INDUSTRIAL CO., LTD, using a wavelength of 650 nm and a numerical aperture of 0.60).

Evaluation Standards

PASS (O): a total jitter value of 8% or below for both linear velocities 3.49 m/s and 14.0 m/s
FAIL (X): a total jitter value of above 8% for either or both linear velocities Reflectance Reflectance was evaluated using the following evaluation standards when reproducing information that has been recorded at both linear velocities of 3.49 m/s and 14.0 m/s at a linear velocity of 3.49 m/s using the "DDU-1000" evaluator (PULSTEC INDUSTRIAL CO., LTD, using a wavelength of 650 nm and a numerical aperture of 0.60).

Evaluation Standards

PASS (O): a reflectance of 45% or above for both linear velocities 3.49 m/s and 14.0 m/s
FAIL (X): a reflectance of below 45% for either or both linear velocities Modulation Factor The modulation factor was evaluated using the following evaluation standards when reproducing information that has been recorded at both linear velocities of 3.49 m/s and 14.0 m/s at a linear velocity of 3.49 m/s using the "DDU-1000" evaluator (PULSTEC INDUSTRIAL CO., LTD, using a wavelength of 650 nm and a numerical aperture of 0.60).

Evaluation Standards

PASS (O): a modulation factor of 60% or above for both linear velocities 3.49 m/s and 14.0 m/s
FAIL (X): a modulation factor of below 60% for either or both linear velocities Errors The incidence of errors was evaluated using the following evaluation standards when reproducing information that has been recorded at both linear velocities of 3.49 m/s and 14.0 m/s at a linear velocity of 3.49 m/s using the "DDU-1000" evaluator (PULSTEC INDUSTRIAL CO., LTD, using a wavelength of 650 nm and a numerical aperture of 0.60) and a "DR-3340"DVD decoder (made by KENWOOD CORPORATION).

Evaluation Standards

PASS (O): a highest error count of 280 or fewer PI errors in 8 ECC blocks for both linear velocities 3.49 m/s and 14.0 m/s FAIL (X): a highest error count of over 280 PI errors in 8 ECC blocks for either or both linear velocities First Embodiment The metal azo dye shown by formula (VI) below was mixed with the pentamethine cyanine dye (with an extinction coefficient of 1.29 at a recording wavelength of 660 nm) shown by formula (III) above at a ratio by weight of 98:2 and after this the recording layer 22 was formed by application according to a spin-coating method and then drying. Also, an Ag reflective layer was formed by a sputtering method as the reflective layer 23. After this, the protective layer 24 was formed using the UV-hardening acrylic resin "DAICURE CLEAR SD318" (made by DAINIPPON INK AND CHEMICALS, INCORPORATED) as the material. The delayed-curing cation polymer adhesive "SK7000" (made by SONY CHEMICAL CORPORATION) was used as the adhesive 40.

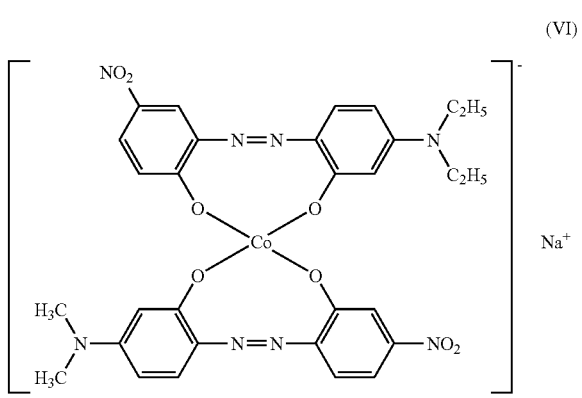

(VI)

Second Embodiment

The metal azo dye shown by formula (VI) above was mixed with the trimethine cyanine dye (with an extinction coefficient of 0.815 at a recording wavelength of 660 nm) shown by formula (IV) above at a ratio by weight of 97:3 and an optical recording medium was manufactured in the same way as the first embodiment.

Third Embodiment

The metal azo dye shown by formula (VI) above was mixed with the pentamethine cyanine dye (with an extinction coefficient of 0.5 at a recording wavelength of 660 nm) shown by formula (V) above at a ratio by weight of 95:5 and an optical recording medium was manufactured in the same way as the first embodiment.

FIRST COMPARATIVE EXAMPLE

The metal azo dye shown by formula (VI) above was mixed with a dye formed as a salt (with an extinction coefficient of 0.4 at a recording wavelength of 660 nm) of the pentamethine cyanine dye shown by formula (VII) below and a benzenedithiol metal complex so as to satisfy the required recording sensitivity (so that recording is possible with an optimal recording power of 24 mW or below). Apart from this, the optical recording medium was manufactured in the same way as the first embodiment. When doing so, the ratio by weight of the first dye to the second dye was 90:10.

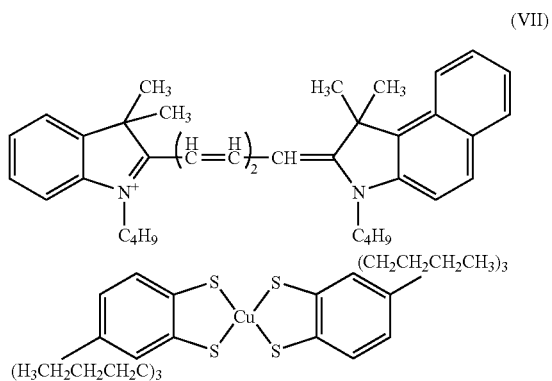

(VII)

SECOND COMPARATIVE EXAMPLE

The metal azo dye shown by formula (VI) above was mixed with a Formazan dye (with an extinction coefficient of 0.45 at a recording wavelength of 660 nm) shown by formula (VIII) below and an optical recording medium was manufactured in the same way as the first comparative example. When doing so, the ratio by weight of the first dye to the second dye was 92:8.

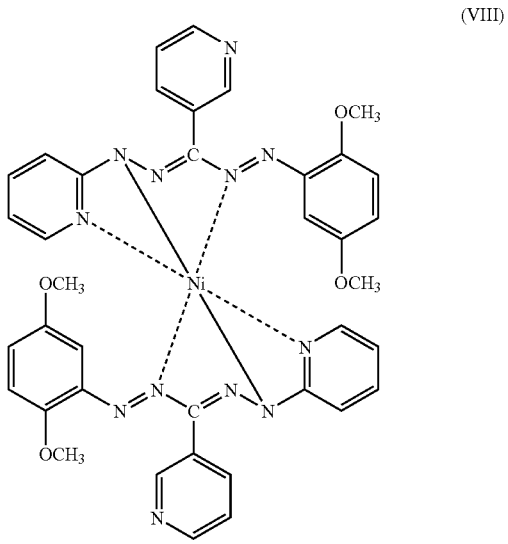

(VIII)

THIRD COMPARATIVE EXAMPLE

The metal azo dye shown by formula (VI) above was mixed with an aminium salt (N,N,N',N'-Tetrakis(4-dibutylaminophenyl)-p-phenylenediammonium bis(perchlorate)

(with an extinction coefficient of 0.1 at a recording wavelength of 660 nm) shown by the formula (IX) below and an optical recording medium was manufactured in the same way as the first comparative example. When doing so, the ratio by weight of the first dye to the second dye was 80:20.

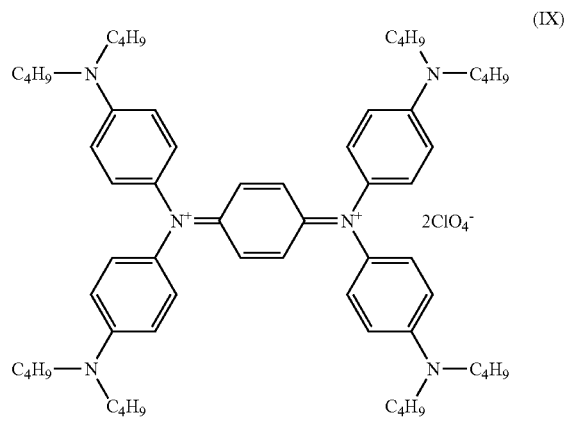

(IX)

The electrical characteristics relating to optimal recording power, jitter, modulation factor, reflectance, and errors (error rate) were evaluated according to the methods described above for the optical recording media manufactured according to the first to third embodiments and optical recording media manufactured according to the above first to third comparative examples. The results of this evaluation are shown in Table 1 below.

Fourth Embodiment

The metal azo dye shown by formula (VI) above was mixed with the pentamethine cyanine dye shown by formula (III) above at a ratio by weight of 99.5:0.5 and the extinction coefficient of the recording layer 22 was set at 0.041, but apart from this, an optical recording medium was manufactured in the same way as the first embodiment. It should be noted that the extinction coefficient in this case is the value for a thin-film state at the recording wavelength of 660 nm (this is also the case for the fifth embodiment to the sixth comparative example below).

Fifth Embodiment

The metal azo dye shown by formula (VI) above was mixed with the pentamethine cyanine dye shown by formula (III) above at a ratio by weight of 98:2 and the extinction coefficient of the recording layer 22 was set at 0.066, but apart from this, an optical recording medium was manufactured in the same way as the first embodiment.

Sixth Embodiment

The metal azo dye shown by formula (VI) above was mixed with the pentamethine cyanine dye shown by formula (III) above at a ratio by weight of 95:5 and the extinction coefficient of the recording layer 22 was set at 0.10, but apart from this, an optical recording medium was manufactured in the same way as the first embodiment.

FOURTH COMPARATIVE EXAMPLE

The metal azo dye shown by formula (VI) above was mixed with the pentamethine cyanine dye shown by formula (III) above at a ratio by weight of 100:0 and the extinction coefficient of the recording layer 22 was set at 0.02, but apart

TABLE 1

|  | FIRST EMBODIMENT | SECOND EMBODIMENT | THIRD EMBODIMENT | FIRST COMPARATIVE EXAMPLE | SECOND COMPARATIVE EXAMPLE | THIRD COMPARATIVE EXAMPLE |
|---|---|---|---|---|---|---|
| % BY WEIGHT OF FIRST DYE | 98 | 97 | 95 | 90 | 92 | 80 |
| % BY WEIGHT OF SECOND DYE | 2 | 3 | 5 | 10 | 8 | 20 |
| ATTENUATION COEFFICIENT OF SECOND DYE | 1.29 | 0.815 | 0.5 | 0.4 | 0.45 | 0.1 |
| OPTIMAL RECORDING POWER | ○ | ○ | ○ | ○ | ○ | ○ |
| JITTER | ○ | ○ | ○ | ○ | ○ | X |
| MODULATION FACTOR | ○ | ○ | ○ | X | X | X |
| REFLECTANCE | ○ | ○ | ○ | X | ○ | X |
| ERRORS | ○ | ○ | ○ | X | X | X |

From Table 1, it can be seen that clearly favorable electrical characteristics were obtained for an optical recording medium in which a dye with an extinction coefficient of 0.5 or above at the recording wavelength of 660 nm is added as the second dye. On the other hand, for a recording medium in which a dye with an extinction coefficient of below 0.5 at the recording wavelength of 660 nm has been added as the second dye, it was confirmed that all of the evaluation items could not been satisfied even if the ratio of the added amounts of the first dye and the second dye is changed.

from this, an optical recording medium was manufactured in the same way as the first embodiment.

FIFTH COMPARATIVE EXAMPLE

The metal azo dye shown by formula (VI) above was mixed with the pentamethine cyanine dye shown by formula (III) above at a ratio by weight of 92:8 and the extinction coefficient of the recording layer 22 was set at 0.13, but apart from this, an optical recording medium was manufactured in the same way as the first embodiment.

SIXTH COMPARATIVE EXAMPLE

The metal azo dye shown by formula (VI) above was mixed with the pentamethine cyanine dye shown by formula (III) above at a ratio by weight of 98.8:0.2, the extinction coefficient of the recording layer 22 was set at 0.028, but apart from this, an optical recording medium was manufactured in the same way as the first embodiment.

The electrical characteristics relating to optimal recording power, jitter, reflectance, and errors (error rate) were evaluated according to the methods described above for the optical recording media manufactured according to the above fourth to sixth embodiments and optical recording media manufactured according to the first to third comparative examples. The results of this evaluation are shown in Table 2 below.

TABLE 2

| | FOURTH EMBODIMENT | FIFTH EMBODIMENT | SIXTH EMBODIMENT | FOURTH COMPARATIVE EXAMPLE | FIFTH COMPARATIVE EXAMPLE | SIXTH COMPARATIVE EXAMPLE |
|---|---|---|---|---|---|---|
| % BY WEIGHT OF FIRST DYE | 99.5 | 98 | 95 | 100 | 92 | 99.8 |
| % BY WEIGHT OF SECOND DYE | 0.5 | 2 | 5 | 0 | 8 | 0.2 |
| ATTENUATION COEFFICIENT OF SECOND DYE | 0.03 | 0.066 | 0.10 | 0.02 | 0.13 | 0.028 |
| OPTIMAL RECORDING POWER | ◯ | ◯ | ◯ | X | ◯ | X |
| JITTER | ◯ | ◯ | ◯ | ◯ | X | X |
| REFLECTANCE | ◯ | ◯ | ◯ | ◯ | X | ◯ |
| ERRORS | ◯ | ◯ | ◯ | ◯ | X | ◯ |

From Table 2, it was confirmed that an optical recording medium where an extinction coefficient of the recording layer 22 is in a range of 0.03 to 0.1 inclusive exhibits clearly favorable electrical characteristics. From these results, it was also confirmed that an optical recording medium with a recording layer 22 in which the added amount of second dye is 0.5% to 5% by weight inclusive exhibits clearly favorable electrical characteristics.

It should be noted that the present invention is not limited to the embodiments described above. For example, the metal azo dye of formula (X) below can be used as the first dye in the present invention.

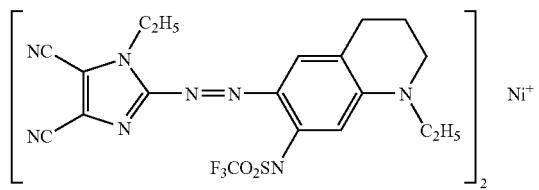

(X)

Although the above describes an example where only one type of chelate compound is used as the first dye, two or more types of chelate compounds may be used in the present invention. Also, while an example is described where a dye, whose characteristics are such that the maximum absorption wavelength for a thin film is in a range of 620 nm to 750 nm inclusive and the extinction coefficient for the recording laser wavelength is 0.5 or above, is used as the second dye in the present invention, the present invention is not limited to such dye, and it is possible to use other dyes that satisfy at least the condition that the extinction coefficient for the recording laser wavelength is 0.5 or above.

It should be obvious that the optical recording medium of the present invention can be applied to a so-called double-sided recording medium where a recording layer and reflective layer are bonded on each side.

What is claimed is:

1. An optical recording medium constructed by providing, on a substrate, a recording layer including a first dye, which in a thin-film state has a maximum absorption wavelength of 450 nm to 620 nm inclusive, as a main component, the recording layer of the optical recording medium being formed so as to include a second dye with an extinction coefficient of at least 0.5 for a recording wavelength.

2. An optical recording medium according to claim 1, wherein in a thin-film state, the second dye has a maximum absorption wavelength of 620 nm to 750 nm inclusive.

3. An optical recording medium according to claim 1, wherein the extinction coefficient of the recording layer in a thin-film state is in a range of 0.03 to 0.1 inclusive for a wavelength of 660 nm.

4. An optical recording medium according to claim 2, wherein the extinction coefficient of the recording layer in a thin-film state is in a range of 0.03 to 0.1 inclusive for a wavelength of 660 nm.

5. An optical recording medium according to claim 1, wherein the recording layer is formed so as to include 0.5% to 5% inclusive by weight of the second dye.

6. An optical recording medium according to claim 2, wherein the recording layer is formed so as to include 0.5% to 5% inclusive by weight of the second dye.

7. An optical recording medium according to claim 3, wherein the recording layer is formed so as to include 0.5% to 5% inclusive by weight of the second dye.

8. An optical recording medium according to claim 1, wherein the first dye is one or a combination of two or more metal azo dyes selected from a group consisting of chelate compounds of a metal and a dye shown by a general formula (I) below

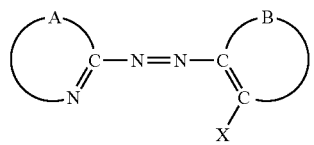

(I)

where A represents residue that forms, together with the carbon atom and nitrogen atom with which A is combined, a heterocyclic ring, B represents residue that forms, together with two carbon atoms with which B is combined, an aromatic ring or a heterocyclic ring, and X represents a hydroxyl group, a carboxyl group, a sulfonic acid-derivative group, or $(NSO_2Q)^-$, where Q represents an alkyl group of one to six carbon atoms that an alkyl group of one to six carbon atoms that may be substituted with one or more fluorine atoms as the substituent(s).

9. An optical recording medium according to claim 2, wherein the first dye is one or a combination of two or more metal azo dyes selected from a group consisting of chelate compounds of a metal and a dye shown by a general formula (I) below

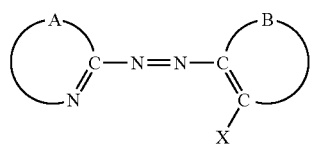

(I)

where A represents residue that forms, together with the carbon atom and nitrogen atom with which A is combined, a heterocyclic ring, B represents residue that forms, together with two carbon atoms with which B is combined, an aromatic ring or a heterocyclic ring, and X represents a hydroxyl group, a carboxyl group, a sulfonic acid-derivative group, or $(NSO_2Q)^-$, where Q represents an alkyl group of one to six carbon atoms that an alkyl group of one to six carbon atoms that may be substituted with one or more fluorine atoms as the substituent(s).

10. An optical recording medium according to claim 3, wherein the first dye is one or a combination of two or more metal azo dyes selected from a group consisting of chelate compounds of a metal and a dye shown by a general formula (I) below

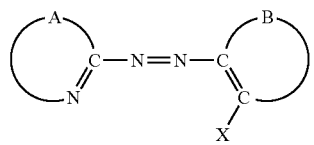

(I)

where A represents residue that forms, together with the carbon atom and nitrogen atom with which A is combined, a heterocyclic ring, B represents residue that forms, together with two carbon atoms with which B is combined, an aromatic ring or a heterocyclic ring, and X represents a hydroxyl group, a carboxyl group, a sulfonic acid-derivative group, or $(NSO_2Q)^-$, where Q represents an alkyl group of one to six carbon atoms that an alkyl group of one to six carbon atoms that may be substituted with one or more fluorine atoms as the substituent(s).

11. An optical recording medium according to claim 5, wherein the first dye is one or a combination of two or more metal azo dyes selected from a group consisting of chelate compounds of a metal and a dye shown by a general formula (I) below

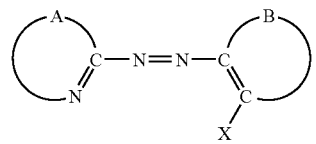

(I)

where A represents residue that forms, together with the carbon atom and nitrogen atom with which A is combined, a heterocyclic ring, B represents residue that forms, together with two carbon atoms with which B is combined, an aromatic ring or a heterocyclic ring, and X represents a hydroxyl group, a carboxyl group, a sulfonic acid-derivative group, or $(NSO_2Q)^-$, where Q represents an alkyl group of one to six carbon atoms that an alkyl group of one to six carbon atoms that may be substituted with one or more fluorine atoms as the substituent(s).

12. An optical recording medium according to claim 1, wherein the second dye is composed of a pentamethine cyanine dye shown by a general formula (II) below

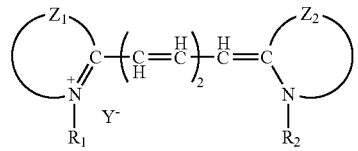

(II)

where R1 and R2 each separately represent an alkyl group of one to six carbon atoms that may be substituted or unsubstituted or an alkenyl group of one to six carbon atoms that may be substituted or unsubstituted, Z1 and Z2 each separately represent a heterocycle with five or six members or an atom group that forms a condensed ring including a heterocycle with five or six members, and Y expresses a univalent anion.

13. An optical recording medium according to claim 2, wherein the second dye is composed of a pentamethine cyanine dye shown by a general formula (II) below

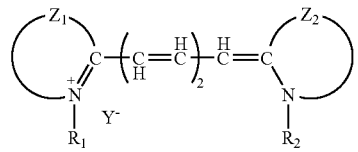

(II)

where R1 and R2 each separately represent an alkyl group of one to six carbon atoms that may be substituted or unsubstituted or an alkenyl group of one to six carbon atoms that may be substituted or unsubstituted, Z1 and Z2 each separately represent a heterocycle with five or six members or an atom group that forms a condensed ring including a heterocycle with five or six members, and Y expresses a univalent anion.

14. An optical recording medium according to claim 3, wherein the second dye is composed of a pentamethine cyanine dye shown by a general formula (II) below

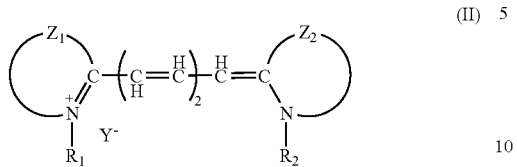
(II)

where R1 and R2 each separately represent an alkyl group of one to six carbon atoms that may be substituted or unsubstituted or an alkenyl group of one to six carbon atoms that may be substituted or unsubstituted, Z1 and Z2 each separately represent a heterocycle with five or six members or an atom group that forms a condensed ring including a heterocycle with five or six members, and Y expresses a univalent anion.

15. An optical recording medium according to claim 5, wherein the second dye is composed of a pentamethine cyanine dye shown by a general formula (II) below

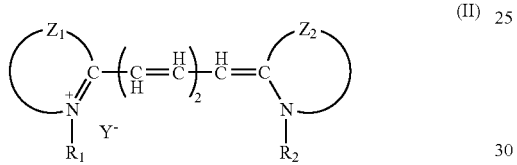
(II)

where R1 and R2 each separately represent an alkyl group of one to six carbon atoms that may be substituted or unsubstituted or an alkenyl group of one to six carbon atoms that may be substituted or unsubstituted, Z1 and Z2 each separately represent a heterocycle with five or six members or an atom group that forms a condensed ring including a heterocycle with five or six members, and Y expresses a univalent anion.

16. An optical recording medium according to claim 8, wherein the second dye is composed of a pentamethine cyanine dye shown by a general formula (II) below

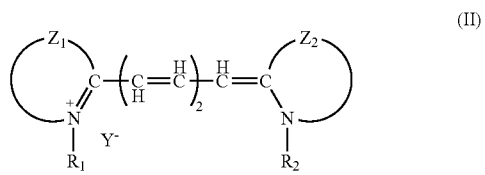
(II)

where R1 and R2 each separately represent an alkyl group of one to six carbon atoms that may be substituted or unsubstituted or an alkenyl group of one to six carbon atoms that may be substituted or unsubstituted, Z1 and Z2 each separately represent a heterocycle with five or six members or an atom group that forms a condensed ring including a heterocycle with five or six members, and Y expresses a univalent anion.

\* \* \* \* \*